(12) United States Patent
Kim et al.

(10) Patent No.: US 11,947,010 B2
(45) Date of Patent: Apr. 2, 2024

(54) DISTANCE MEASUREMENT DEVICE AND CONTROL METHOD THEREFOR

(71) Applicant: VC INC., Seoul (KR)

(72) Inventors: Juno Kim, Anyang-si (KR); Hohyeong Lee, Seoul (KR); Hundong Lim, Yongin-si (KR); Taekuen Park, Seoul (KR); Sang Il Jin, Seoul (KR)

(73) Assignee: VC INC., Seoul (KR)

( * ) Notice: Subject to any disclaimer, the term of this patent is extended or adjusted under 35 U.S.C. 154(b) by 296 days.

(21) Appl. No.: 16/766,723

(22) PCT Filed: Apr. 18, 2018

(86) PCT No.: PCT/KR2018/004485
§ 371 (c)(1),
(2) Date: May 25, 2020

(87) PCT Pub. No.: WO2019/107675
PCT Pub. Date: Jun. 6, 2019

(65) Prior Publication Data
US 2020/0284905 A1 Sep. 10, 2020

(30) Foreign Application Priority Data
Nov. 28, 2017 (KR) .......................... 10-2017-0159897

(51) Int. Cl.
*G01S 17/08* (2006.01)
*A63B 69/36* (2006.01)
(Continued)

(52) U.S. Cl.
CPC .......... *G01S 17/08* (2013.01); *A63B 69/3605* (2020.08); *A63B 69/3691* (2013.01);
(Continued)

(58) Field of Classification Search
CPC .......... G01S 17/08; G01S 17/42; G01S 19/19; A63B 69/3605; A63B 69/3691; G01C 17/02; G01P 15/00
See application file for complete search history.

(56) References Cited

U.S. PATENT DOCUMENTS

| | | | | | |
|---|---|---|---|---|---|
| 3,552,290 | A | * | 1/1971 | Brechtel | G09B 29/006 473/409 |
| 9,383,753 | B1 | * | 7/2016 | Templeton | G01S 17/89 |

(Continued)

FOREIGN PATENT DOCUMENTS

| | | |
|---|---|---|
| CN | 101171588 | 4/2008 |
| CN | 101378812 | 3/2009 |

(Continued)

OTHER PUBLICATIONS

KIPO, PCT Search Report & Written Opinion of PCT/KR2018/004485 dated Aug. 28, 2018.
SIPO, Search Report of CN 201880076611.0 dated Jan. 21, 2021.

*Primary Examiner* — Malina D. Blaise
(74) *Attorney, Agent, or Firm* — LEX IP MEISTER, PLLC

(57) ABSTRACT

An exemplary embodiment has been made in an effort to provide a distance measuring apparatus, including: an output unit configured to output information; a memory configured to store map information of golf courses; a location acquiring sensor configured to acquire a current location; a distance measuring sensor configured to measure a distance to a target; a slope sensor configured to measure a tilt angle; and a control unit configured to read map information of the golf course corresponding to the current location from the memory, to calculate a first distance from the current location to a first point on the golf course by using the map information, to calculate a horizontal distance to the target by using the distance to the target and the tilt angle, and to (Continued)

output the horizontal distance to the output unit when the horizontal distance is within the first distance.

18 Claims, 13 Drawing Sheets

(51) Int. Cl.
 *G01C 17/02* (2006.01)
 *G01P 15/00* (2006.01)
 *G01S 17/42* (2006.01)
 *G01S 19/19* (2010.01)
 *A63B 71/06* (2006.01)

(52) U.S. Cl.
 CPC .............. *G01C 17/02* (2013.01); *G01P 15/00* (2013.01); *G01S 17/42* (2013.01); *G01S 19/19* (2013.01); *A63B 71/0622* (2013.01); *A63B 2071/0625* (2013.01); *A63B 2071/0655* (2013.01); *A63B 2071/0691* (2013.01); *A63B 2071/0694* (2013.01); *A63B 2220/12* (2013.01); *A63B 2220/18* (2013.01); *A63B 2220/20* (2013.01)

(56) References Cited

U.S. PATENT DOCUMENTS

| | | | | |
|---|---|---|---|---|
| 2004/0032970 | A1* | 2/2004 | Kiraly | A63B 24/0021 382/103 |
| 2006/0008116 | A1* | 1/2006 | Kiraly | G06T 7/20 382/103 |
| 2012/0109577 | A1* | 5/2012 | Nyhart | G01C 3/08 702/159 |
| 2013/0046461 | A1* | 2/2013 | Balloga | G01S 7/4972 701/438 |
| 2015/0143870 | A1* | 5/2015 | Shibuya | G09B 19/0038 73/510 |
| 2017/0010359 | A1* | 1/2017 | Jung | G01S 17/08 |
| 2017/0031030 | A1* | 2/2017 | Verdugo | G01S 17/10 |
| 2017/0263049 | A1* | 9/2017 | MacDonald | G01J 1/0266 |
| 2019/0154439 | A1* | 5/2019 | Binder | G01B 11/26 |
| 2020/0124738 | A1* | 4/2020 | Kim | G01S 17/88 |

FOREIGN PATENT DOCUMENTS

| | | |
|---|---|---|
| CN | 202569412 | 12/2012 |
| CN | 103533993 | 1/2014 |
| JP | 2008-203188 | 9/2008 |
| JP | 2015-150061 | 8/2015 |
| JP | 2016-048825 | 4/2016 |
| KR | 10-2001-0092142 | 10/2001 |
| KR | 10-2004-0009499 | 1/2004 |
| KR | 10-2011-0088844 | 8/2011 |
| KR | 10-2013-0092817 | 8/2013 |
| KR | 10-2015-0093340 | 8/2015 |

\* cited by examiner

DISTANCE MEASUREMENT DEVICE AND CONTROL METHOD THEREFOR

TECHNICAL FIELD

The present disclosure relates to a distance measuring apparatus and a method for controlling the same.

BACKGROUND ART

Golf is a sport in which a golfer hits a golf ball into a hole. A golfer determines a target point in consideration of a current location of a golf ball and a location of a hole, and selects an appropriate golf club and hits the golf ball so that the golf ball moves to the target point.

In order to determine a location of a hole and a distance from a current location to the hole, a golfer refers to a flag (pin) affixed in a hole and a distance indication fixed facility installed along a fairway. However, the location of the hole is frequently changed, so that the fixed facility cannot reflect the momentarily changed location of the hole. Accordingly, it is difficult for the golfer to accurately grasp the distance from the current location to the hole.

Recently, a distance measuring apparatus using a distance measuring sensor has been released in order to more accurately measure a distance in a field. The distance measuring sensor measures the distance to the hole by emitting light, sound waves, etc. toward the target and receiving light, sound waves, etc. reflected from the pin.

However, even when using such a distance measurement sensor, the golfer has a problem in that it is difficult to fire light and sound waves by aiming at the pin accurately. In addition, when the golfer aims at an object other than the pin (e.g., a tree, a structure, etc.), the distance measuring apparatus has a problem of guiding the distance to the object rather than the pin to the golfer.

DISCLOSURE

Technical Problem

An object of the present disclosure is to solve the aforementioned problems and other problems. Another object is to provide a distance measuring apparatus for guiding a location of a hole in a field and a control method thereof.

Another object is to provide a distance measuring apparatus for guiding a distance to a hole in a field and a control method thereof.

Technical Solution

The present invention has been made in an effort to provide a distance measuring apparatus including: an output unit configured to output information; a memory configured to store map information of golf courses; a location acquiring sensor configured to acquire a current location; a distance measuring sensor configured to measure a distance to a target; a slope sensor configured to measure a tilt angle; and a control unit configured to read map information of the golf course corresponding to the current location from the memory, to calculate a first distance from the current location to a first point on the golf course by using the map information, to calculate a horizontal distance to the target by using the distance to the target and the tilt angle, and to output the horizontal distance to the output unit when the horizontal distance is within the first distance.

The distance measuring apparatus may further include an azimuth sensor configured to measure an azimuth, and the control unit may output the horizontal distance when the azimuth is included in a range between a first azimuth in a direction connecting a second point of the golf course from the current location and a second azimuth in a direction of connecting a third point of the golf course from the current location.

The second point and the third point may be two points where an arc and two radii of a fan having the first distance as a length of a radius thereof meet each other when a length of the arc of the fan satisfies a predetermined length.

A central angle of the fan is bisected by a connection line between the current location and the first point.

The second point and the third point may be two points where two tangent lines from the current location to the green of the golf course contact the green.

The first point may be a longest point from the current location on the green of the golf course.

The control unit may further calculate a second distance from the current location to a fourth point of the golf course, and may output the horizontal distance to the output unit when the horizontal distance is included in a range between the first distance and the second distance, and the fourth point may be a shortest point from the current location on the green of the golf course.

The second point and the third point may be two points that are in contact with a circle centered on the central point of the green of the golf course from the current position and having a predetermined distance as a radius, and the first point may be a longest point from the current location on the circle.

The control unit may calculate an altitude of the target by using an altitude of the current location, the distance to the target, and the tilt angle, and may calculate a horizontal distance to the target when the altitude of the target is included between the altitude of the hole obtained from the map information and a sum of a predetermined height and the altitude of the hole.

The control unit may output a message for guiding re-measurement to the output unit when the horizontal distance is outside the first distance.

The present invention has been made in an effort to provide a control method of a distance measuring apparatus, including: acquiring, by a location acquiring sensor, a current location of the distance measuring apparatus;

reading out, by a control unit, map information of golf courses corresponding to the current location from a memory in which the map information of the golf courses is stored; measuring, by a distance measuring sensor, a distance to a target; measuring, by a slope sensor, a sloped tilt angle; calculating, by the control unit, a horizontal distance to the target by using the distance to the target and the tilt angle; calculating, by the control unit, a first distance from the current location to a first point of the golf course; and outputting, by the control unit, the horizontal distance when the horizontal distance is within a first distance.

The control method may further include: measuring, by an azimuth sensor, an azimuth to which the distance measuring apparatus is directed; and outputting, by the control unit, the horizontal distance when the azimuth is included in a range between a first azimuth in a direction connecting a second point of the golf course from the current location and a second azimuth in a direction of connecting a third point of the golf course from the current location.

The second point and the third point may be two points where an arc and two radii of the fan having the first distance as a length of a radius thereof meet each other when a length of the arc of the fan satisfies a predetermined length.

A central angle of the fan is bisected by a connection line between the current location and the first point.

The second point and the third point may be two points where two tangent lines from the current location to the green of the golf course contact the green.

The first point may be a longest point from the current location on the green of the golf course.

The calculating the first distance includes calculating, by the control unit, a second distance from the current location to a fourth point of the golf course, the outputting the horizontal distance includes outputting, by the control unit, the horizontal distance when the horizontal distance is included in a range between the first distance and the second distance, and the fourth point is a shortest point from the current location on the green of the golf course.

The second point and the third point may be two points that are in contact with a circle centered on the central point of the green of the golf course from the current position and having a predetermined distance as a radius, and the first point may be a longest point from the current location on the circle.

The control method may further include: before the calculating the horizontal distance, calculating, by the control unit, an altitude of the target by using an altitude of the current location, the distance to the target, and the tilt angle; and calculating, by the control unit, a horizontal distance to the target when the altitude of the target is included between the altitude of the hole obtained from the map information and a sum of a predetermined height and the altitude of the hole.

The control method may further include outputting, by the control unit, a message for guiding re-measurement to the output unit when the horizontal distance is outside the first distance.

Advantageous Effects

The effects of the distance measuring apparatus and the control method thereof according to the present disclosure will be described as follows.

According to at least one of the embodiments of the present disclosure, a golfer can easily check a location of a hole.

According to at least one of the embodiments of the present disclosure, a golfer can easily check a distance to a hole.

The additional range of applicability of the present disclosure will become apparent from the following detailed description. However, since various modifications and alternatives within the spirit and scope of the present disclosure may be clearly understood by those skilled in the art, it is to be understood that a detailed description and a specific exemplary embodiment of the present invention are provided only by way of example.

MODE FOR INVENTION

Figure 1:
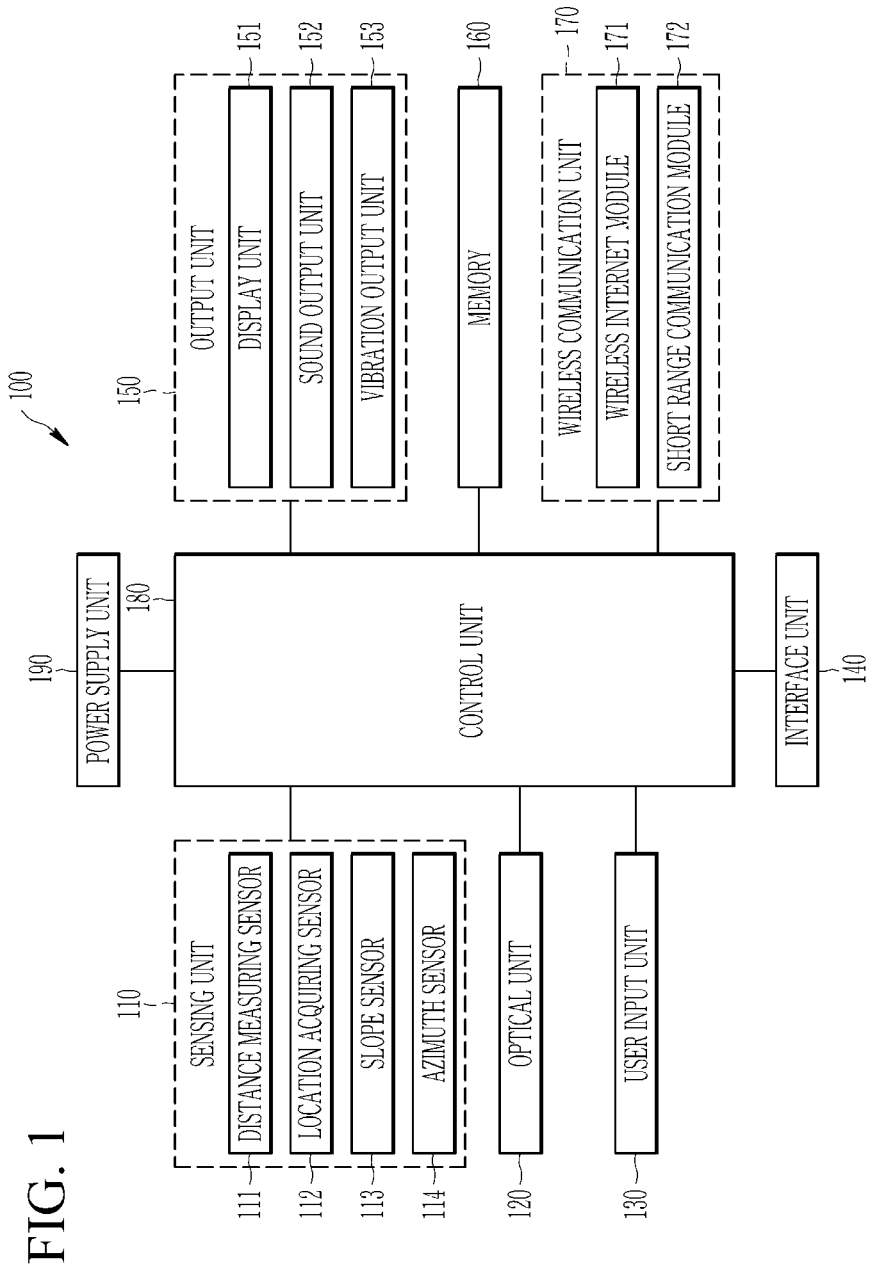
FIG. 1 illustrates a block diagram for describing a distance measuring apparatus according to an exemplary embodiment.

Hereinafter, exemplary embodiments disclosed in the present specification will be described in detail with reference to the accompanying drawings. In the present specification, the same or similar components will be denoted by the same or similar reference numerals, and a repeated description thereof will be omitted. Terms "module" and "unit" for components used in the following description are used only in order to easily describe the specification. Therefore, these terms do not have meanings or roles that distinguish them from each other in and of themselves. In describing exemplary embodiments of the present specification, when it is determined that a detailed description of the well-known art associated with the present invention may obscure the gist of the present invention, it will be omitted. The accompanying drawings are provided only in order to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprises" and "have" used in the present specification specify the presence of stated features, numerals, steps, operations, components, parts, or combinations thereof, but do not preclude the presence or addition of one or more other features, numerals, steps, operations, components, parts, or combinations thereof.

Figure 2:
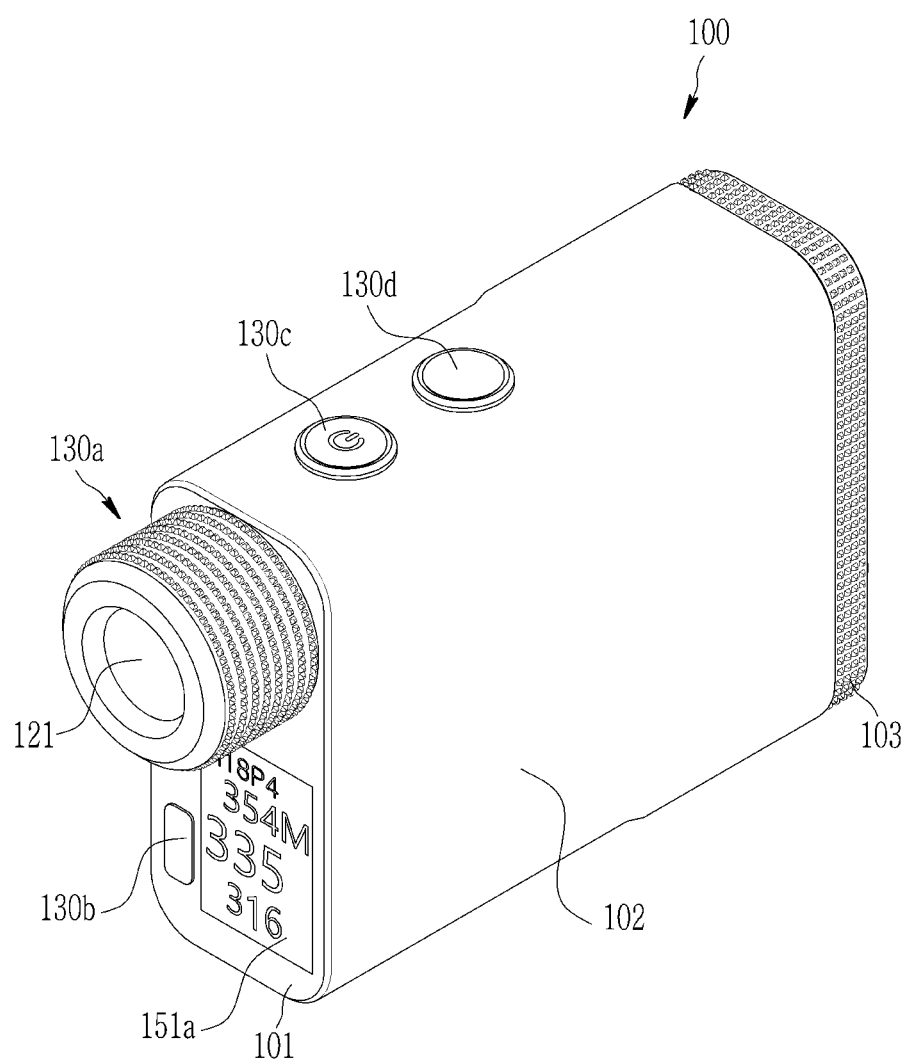
FIG. 2 and FIG. 3 illustrate schematic diagrams of examples of a distance measuring apparatus viewed in different directions according to an exemplary embodiment.
Figure 3:
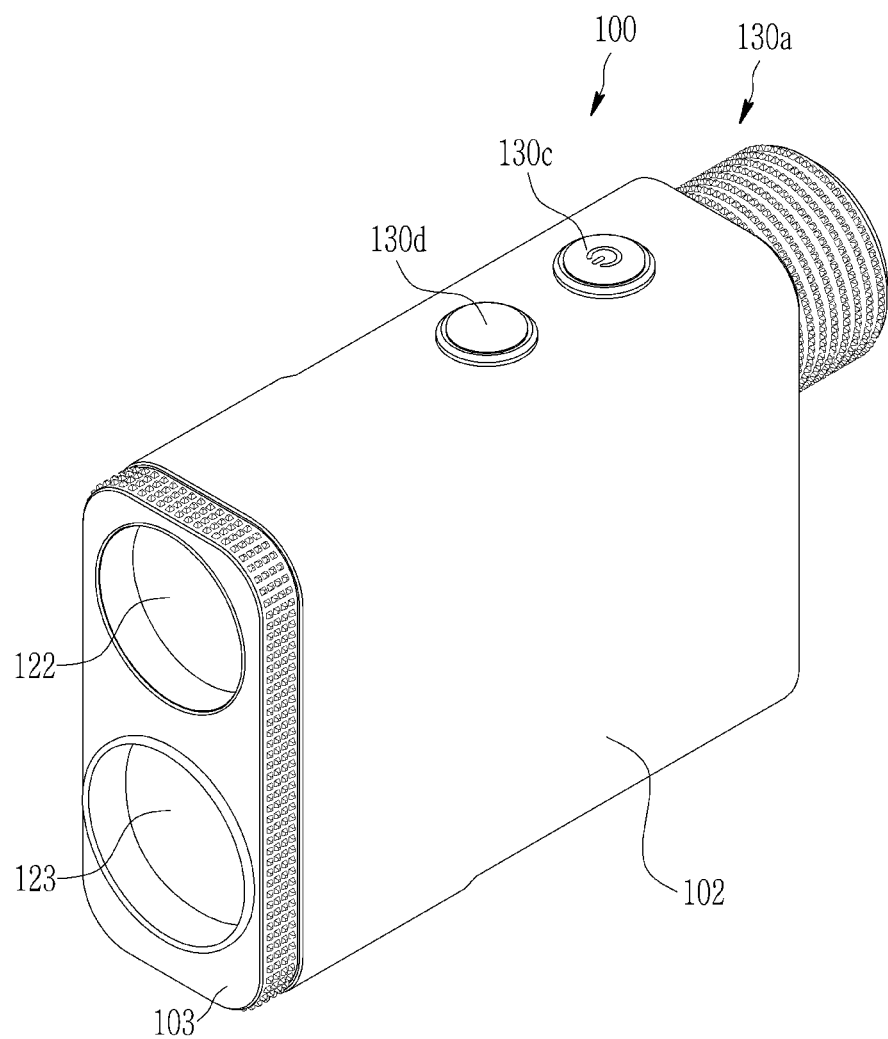

FIG. 1 illustrates a block diagram for describing a distance measuring apparatus 100 according to an exemplary embodiment, and FIG. 2 and FIG. 3 illustrate schematic diagrams of examples of the distance measuring apparatus 100 viewed in different directions according to an exemplary embodiment.

The distance measuring apparatus 100 may include a sensing unit 110, an optical unit 120, a user input unit 130, an interface unit 140, an output unit 150, a memory 160, a wireless communication unit 170, a control unit 180, a power supply unit 190, and the like. The constituent elements shown in FIG. 1 are not essential for implementing the distance measuring apparatus 100, so the distance measuring apparatus 100 described in the present specification may include more or less constituent elements than the foregoing listed constituent elements.

More particularly, among the constituent elements, the sensing unit 110 may include one or more sensors for sensing at least one of information on an environment surrounding the distance measuring apparatus 100 and information within the distance measuring apparatus 100. For example, the sensing unit 110 may include at least one of a distance measuring sensor 111, a location acquiring sensor 112, an acceleration sensor 113, an azimuth sensor 114, a gyroscope sensor, a battery gauge, and an environment sensor (for example, a barometer, a hydrometer, and a thermometer). In the meantime, the distance measuring apparatus 100 disclosed in the present specification may utilize a combination of information sensed by at least two or more sensors among the sensors.

First, the distance measuring sensor 111 refers to a sensor which measures a distance to a target. The distance measuring sensor 111 may include an ultrasonic sensor, an infrared sensor (IR sensor), a laser sensor, a radio detecting and ranging sensor (radar sensor), an optical sensor (for example, a camera), and the like. The distance measuring sensor 111 is not limited to the listed kinds of sensors, and includes all kinds of sensors measuring a distance to a target.

Hereinafter, it is assumed that the distance measuring sensor 111 is a laser sensor, which transmits a laser in a front direction and receives a laser reflected from a target to measure a distance to the target.

The location acquiring sensor 112 is a sensor for acquiring a location of the distance measuring apparatus 100, and a representative example of the location acquiring sensor 112 is a global positioning system (GPS) sensor. The GPS sensor calculates distance information from three or more separate satellites and accurate time information and then applies trigonometry to the calculated information, thereby accurately calculating 3D current location information according to the latitude, the longitude, and the altitude. Currently, a method of calculating location and time information by using three satellites and correcting errors of the calculated location and time information by using one other satellite is widely used. Further, the GPS sensor may calculate speed information by continuously calculating a current location in real time.

A slope sensor 113 may acquire the degree of tilt of the distance measuring apparatus 100. The slope sensor 113 may include an acceleration sensor (accelerometer) measuring gravitational acceleration. Further, the slope sensor 113 may also be implemented by a scheme of calculating a tilt by using a rotation angle in a vertical direction from a predetermined reference direction acquired by a gyro sensor, and the like.

The azimuth sensor 114 is a sensor measuring an azimuth, and may acquire a value of an azimuth to which the distance measuring apparatus 100 is directed. The azimuth sensor 114 may be a geomagnetic sensor, which detects the earth's magnetic field and measures an azimuth. Further, the azimuth sensor 114 may also be implemented by a scheme of calculating an azimuth by using a rotation angle in a horizontal direction from a predetermined reference direction acquired by a gyro sensor, and the like.

The optical unit 120 has a structure for receiving external light, and may include a lens unit, a filter unit, and the like. The optical unit 120 optically processes light from a subject. The lens unit may include a zoom lens, a focusing lens, a compensating lens, and the like, and the filter unit may include an ultraviolet filter (UV filter), an optical low pass filter, and the like.

Next, the user input unit 130 receives input of information from a user, and when information is input through the user input unit 130, the control unit 180 may control an operation of the distance measuring apparatus 100 so as to correspond to the input information. The user input unit 130 may include a mechanical input means (for example, a mechanical key, a button located on a front surface, a rear surface, or a lateral surface of the distance measuring apparatus 100, a dome switch, a jog wheel, and a jog switch) and a touch-type input means. For example, the touch-type input means may be formed of a virtual key, a soft key, or a visual key displayed on a touch screen through software processing, or a touch key disposed in a portion other than the touch screen. In the meantime, the virtual key or the visual key may be displayed on the touch screen with various forms, and for example, the virtual key or the visual key may be formed of a graphic, a text, an icon, a video, or a combination thereof.

The interface unit 140 serves as a passage of various kinds of external devices connected with the distance measuring apparatus 100. The interface unit 140 may include at least one of an external charger port, a wired/wireless data port, and a memory 160 card port. The distance measuring apparatus 100 may perform appropriate control related to the connected external device in response to the connection of the external device to the interface unit 140.

The output unit 150 generates an output related to a visual sense, an auditory sense, or a tactile sense, and may include a display unit 151, a sound output unit 152, a vibration output unit 153, and the like.

The display unit 151 displays (outputs) information processed by the distance measuring apparatus 100. For example, the display unit 151 may display execution image information of an application program driven in the distance measuring apparatus 100, or user interface (UI) and graphical user interface (GUI) information according to the execution image information.

The display unit 151 may include at least one of a liquid crystal display (LCD), a thin film transistor-liquid crystal display (TFT LCD), an organic light-emitting diode (OLED), and an e-ink display.

In addition, two or more display units 151 may exist according to an implementation form of the distance measuring apparatus 100. In this case, the plurality of display units 151 may be disposed together on an external surface of the distance measuring apparatus 100 and in an internal portion of the distance measuring apparatus 100, or the plurality of display units 151 may be individually disposed on an external surface of the distance measuring apparatus 100 and in an internal portion of the distance measuring apparatus 100, respectively.

A display unit 151*a* disposed on the external surface of the distance measuring apparatus 100 may include a touch sensor, which detects a touch to the display unit 151*a*, so as to receive an input of a control command by a touch scheme. When a touch is input to the display unit 151*a* by using the display unit 151*a*, the touch sensor may detect the touch, and the control unit 180 may generate a control command corresponding to the touch based on the detected touch. Contents input by the touch scheme may be letters or numbers, or may be menu items indicatable or designable in various modes.

A display unit 151*b* disposed in the internal portion of the distance measuring apparatus 100 may display an image to a user through an ocular lens 121 of the distance measuring apparatus 100. The display unit 151*b* disposed in the internal portion of the distance measuring apparatus 100 includes a transparent display (or a semi-transparent display), which is directly located on an optical path of the ocular lens 121. A representative example of the transparent display is a transparent OLED (TOLED). Further, the display unit 151*b* disposed in the internal portion of the distance measuring apparatus 100 may be an opaque display, which provides an image to the optical path of the ocular lens 121 through an optical member having a function of refracting or reflecting light and the like.

The sound output unit 152 may output audio data stored in the memory 160 in the form of a sound, and may be implemented in the form of a loudspeaker, which outputs various alarm sounds or a playback sound of multimedia.

The vibration output unit 153 generates various tactile effects that the user may feel. Intensity, a pattern, and the like of the vibration generated by the vibration output unit 153 may be controlled by a selection of the user or a setting of the control unit 180. For example, the vibration output unit 153 may also combine and output different vibrations or sequentially output different vibrations.

In addition, the output unit 150 may further include a light output unit, which outputs a signal notifying of generation of an event by using light of a light source.

Further, the memory 160 stores data (for example, the data includes course map information about a tee box, a fairway, a hazard, a bunker, a rough, a green, a hole of a golf course, and the like, but is not limited thereto) supporting various functions of the distance measuring apparatus 100. The memory 160 may store firmware and an application program driven in the distance measuring apparatus 100 and data and commands for an operation of the distance measuring apparatus 100. At least some of the application programs may be installed in the distance measuring apparatus 100 at the time of shipment for the basic function of the distance measuring apparatus 100. Further, at least some of the application programs may be downloaded from an external server through wireless communication. In the meantime, the application program may be stored in the memory 160 and is installed in the distance measuring apparatus 100, thereby being driven so as to perform the operation (or the function) of the distance measuring apparatus 100 by the control unit 180.

The wireless communication unit 170 may include one or more modules, which are capable of establishing wireless communication between the distance measuring apparatus 100 and a wireless communication system, the distance measuring apparatus 100 and other available wireless communication devices, or the distance measuring apparatus 100 and an external server.

The wireless communication unit 170 may include a wireless Internet module 171 and a short range communication module 172.

The wireless Internet module 171 refers to a module for wireless Internet connection, and may be embedded in the distance measuring apparatus 100. The wireless Internet module 171 is configured to transmit and receive wireless signals in a communication network according to wireless Internet technologies. The wireless Internet module 171 transceives a wireless signal in a communication network according to the wireless Internet technologies. Examples of the wireless Internet technology include a Wireless Local Area Network (WLAN), Wireless Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A), and the wireless Internet module 171 transceives data according to at least one wireless Internet technology in a range including Internet technology which is not listed above.

The short range communication module 172 is for short range communication, and may support short range communication by using at least one of Bluetooth™, Radio Frequency Identification (RFID), Infrared Data Association (IrDA), Ultra Wideband (UWB), ZigBee, Near Field Communication (NFC), Wi-Fi, Wi-Fi direct, and Wireless Universal Serial Bus (USB) technologies. The short range communication module 172 may support wireless communication between the distance measuring apparatus 100 and a wireless communication system, the distance measuring apparatus 100 and a wireless communication available device, or the distance measuring apparatus 100 and a network, in which an external server is located, through a wireless area network. The wireless area network may be a wireless personal area network.

Herein, the wireless communication available device may be a wearable device (for example, a smart watch and smart glasses) which is capable of exchanging (interlocking) data with the distance measuring apparatus 100 according to the present invention. The short range communication module 172 may detect (or recognize) a wearable device which is capable of communicating with the distance measuring apparatus 100, around the distance measuring apparatus 100. Further, when the detected wearable device is a device authenticated to communicate with the distance measuring apparatus 100 according to the exemplary embodiment, the control unit 180 may transmit at least a part of the data processed in the distance measuring apparatus 100 to the wearable device through the short range communication module 172. Accordingly, a user of the wearable device may use the data processed in the distance measuring apparatus 100 through the wearable device.

The control unit 180 generally controls an overall operation of the distance measuring apparatus 100 in addition to the operation related to the application program. The control unit 180 processes the input or output signal, data, information, and the like, or drives the application program stored in the memory 160 through the foregoing constituent elements, thereby providing the user with or processing the appropriate information or function.

Further, the control unit 180 may control at least a part of the constituent elements described with reference to FIG. 1 in order to drive the application program stored in the memory 160. Further, the control unit 180 may combine two or more of the constituent elements included in the distance measuring apparatus 100 and operate the combined constituent elements for driving the application program.

The power supply unit 190 receives power from an external power source and an internal power source, and supplies the power from the power source to each constituent element included in the distance measuring apparatus 100 under the control of the control unit 180. The power supply unit 190 includes a battery, and the battery may be an embedded battery or a replaceable battery.

At least a part of the constituent elements may cooperate with each other and be operated for operating, controlling, or implementing a method for controlling the distance measuring apparatus 100 according to various exemplary embodiments described below. Further, the operation, the control, or the method for controlling the distance measuring apparatus 100 may be implemented in the distance measuring apparatus 100 through driving of at least one application program stored in the memory 160.

Referring to FIGS. 2 and 3, the disclosed distance measuring apparatus 100 includes a body having the form of a column, of which a front surface and a rear surface have oval track shapes. However, the present invention is not limited thereto, and is applicable to various structures, such as a watch type, a clip type, a glasses type, or a slide type, and a swing type and a swivel type in which two or more bodies are combined to be relatively movable. The form of the body may be related to a specific type of distance measuring apparatus 100, but a description of the specific type of distance measuring apparatus 100 may be generally applied to a distance measuring apparatus 100 of other types.

Herein, the body may be understood as a concept of the distance measuring apparatus 100 being considered as at least one assembly.

The distance measuring apparatus 100 includes a case (for example, a frame, a housing, and a cover) configuring an exterior appearance. As shown, the distance measuring apparatus 100 may include a front case 101, a middle case 102, and a rear case 103. Various electronic components are disposed in an internal space formed by a combination of the front case 101, the middle case 102, and the rear case 103.

The cases may be formed by injecting a synthetic resin or may be formed of a metal, for example, stainless steel (STS), aluminum (Al), and titanium (Ti), and external portions of the cases may also be covered with leather, rubber, and the like.

An ocular lens 121, a first operation unit 130a, a second operation unit 130b, and a display unit 151a may be disposed in the front case 101. In this case, the first operation unit 130a may be disposed in the form of a jog wheel in a circumference of the ocular lens 121, thereby protecting the ocular lens 121.

A third operation unit 130c and a fourth operation unit 130d may be disposed on one surface of the middle case 102. The user may conveniently operate the third operation unit 130c and the fourth operation unit 130d while holding the distance measuring apparatus 100.

One or more object lens 122 and 123 may be disposed in the rear case 103. The object lens 122 and 123 may receive light from the outside. For example, the object lens 122 located at the upper side may receive light from a subject to enable the user to check the subject by eye through the ocular lens 121. When the laser emitted from the distance measuring apparatus 100 is reflected from the target, the object lens 123 located at the lower side may receive the reflected laser.

The configurations are not limited to the foregoing disposition. The configurations may be excluded or replaced as necessary, or may be disposed in other surfaces. For example, the display unit 151a and the second operation unit 130b may not be provided in the front surface of the body, and the number of operation units 130a, 130b, 130c, and 130d may be changed.

Next, the optical unit 120 and the distance measuring sensor 111 of the distance measuring apparatus 100 will be described in detail with reference to FIG. 4.

Figure 4:
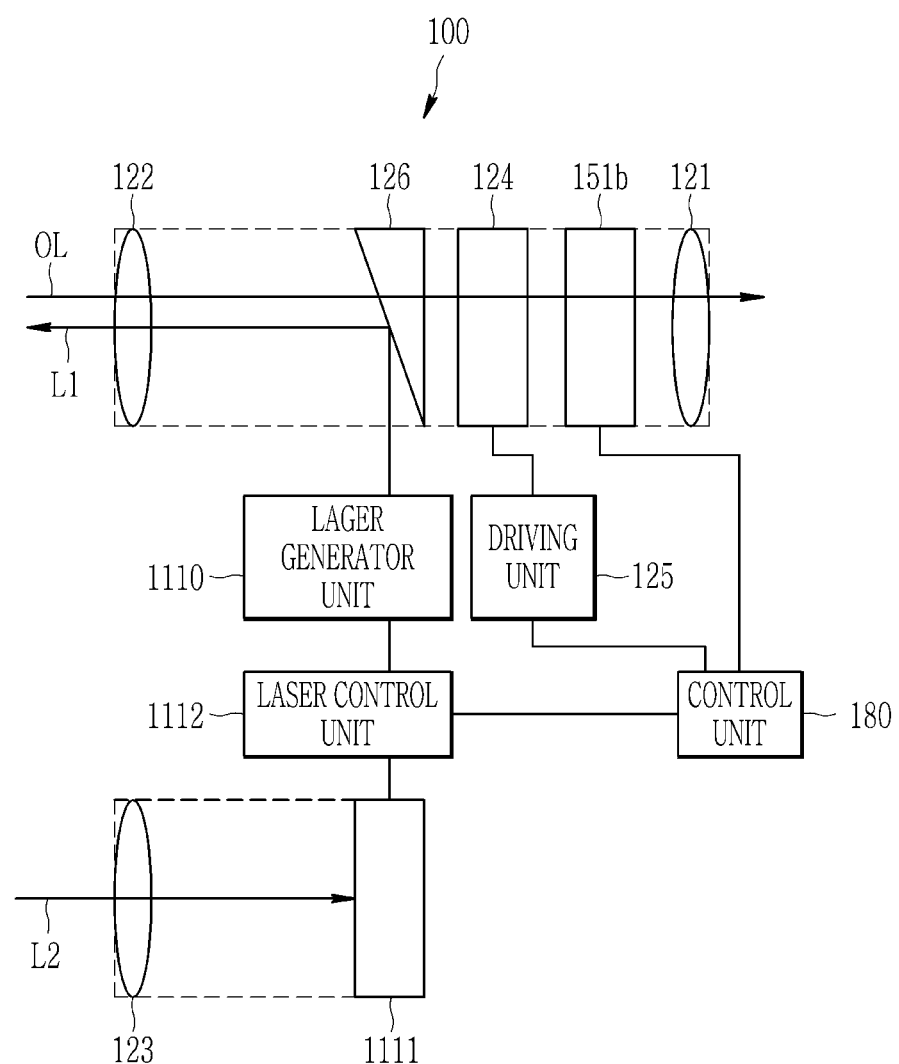
FIG. 4 illustrates a schematic structural diagram of an optical unit and a distance measuring sensor of a distance measuring apparatus according to an exemplary embodiment.

FIG. 4 is a schematic structural diagram of the optical unit 120 and the distance measuring sensor 111 of the distance measuring apparatus 100 related to one exemplary embodiment.

The distance measuring apparatus 100 according to one exemplary embodiment includes the two object lens 122 and 123, one ocular lens 121, a light path changing unit 126, a light processing unit 124, the display unit 151a, a laser generating unit 1110, a laser receiving unit 1111, a laser control unit 1112, and the control unit 180.

Through the first object lens 122, external light OL may be incident to the distance measuring apparatus 100, or a laser L1 generated in the laser generating unit 1110 may be emitted to the outside. A path of the laser L1 generated in the laser generating unit 1110 may be changed through the light path changing unit 126 so that the laser L1 heads to the first object lens 122.

The external light OL passes through the first object lens 122 and the light path changing unit 126 to be incident to the light processing unit 124. The light processing unit 124 includes a lens unit and a filter unit. The external light OL incident to the light processing unit 124 is optically processed and heads to the ocular lens 121 side. The lens unit processes light according to the driving of a driving unit 125. For example, when the user operates the first operation unit 130a and the like, the driving unit 125 is driven and a zoom lens moves, so that a zoom-in or zoom-out operation is performed.

Through the second object lens 123, a laser L2 reflected from the target may be incident to the distance measuring apparatus 100. The laser receiving unit 1111 receives the laser L2 incident through the second object lens 123, and outputs a corresponding signal to the laser control unit 1112.

Then, the laser control unit 1112 may calculate a distance from the distance measuring apparatus 100 to the target by using the signal received from the laser receiving unit 1111. The calculated distance value is output to the control unit 180.

The display unit 151b may be formed of a transparent or semi-transparent display and be directly disposed in a path through which the external light OL passes. Otherwise, the display unit 151b may provide an image to the optical path of the ocular lens 121 through an optical member having a function of refracting or reflecting light and the like.

Hereinafter, a control method implementable by the distance measuring apparatus 100 formed as described above and relevant exemplary embodiments will be described with reference to the accompanying drawings. It is obvious to those skilled in the art that the present invention may be embodied in another specific form within a range of a spirit and an essential characteristic of the present invention.

A control method of the distance measuring apparatus 100 according to a first exemplary embodiment will be described with and to FIG. 5 and FIG. 6.

Figure 5:
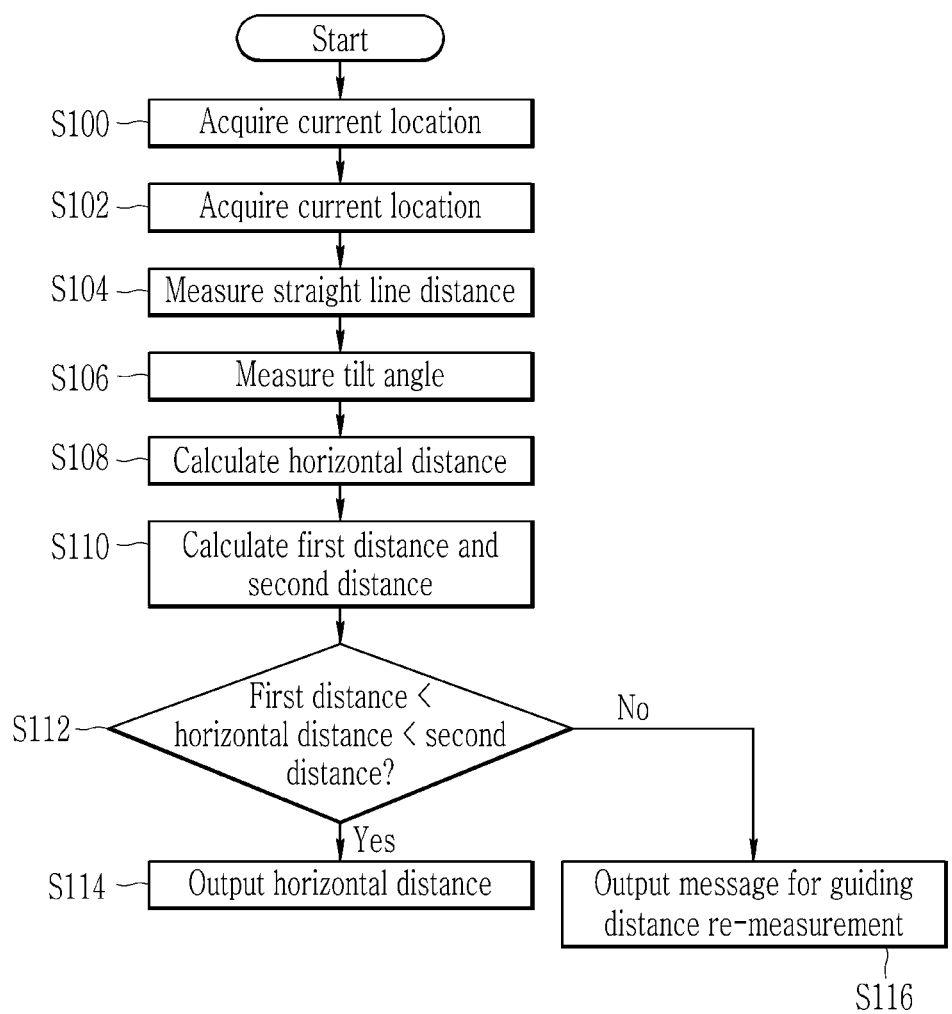
FIG. 5 illustrates a flowchart of a control method of a distance measuring apparatus according to a first exemplary embodiment.
Figure 6:
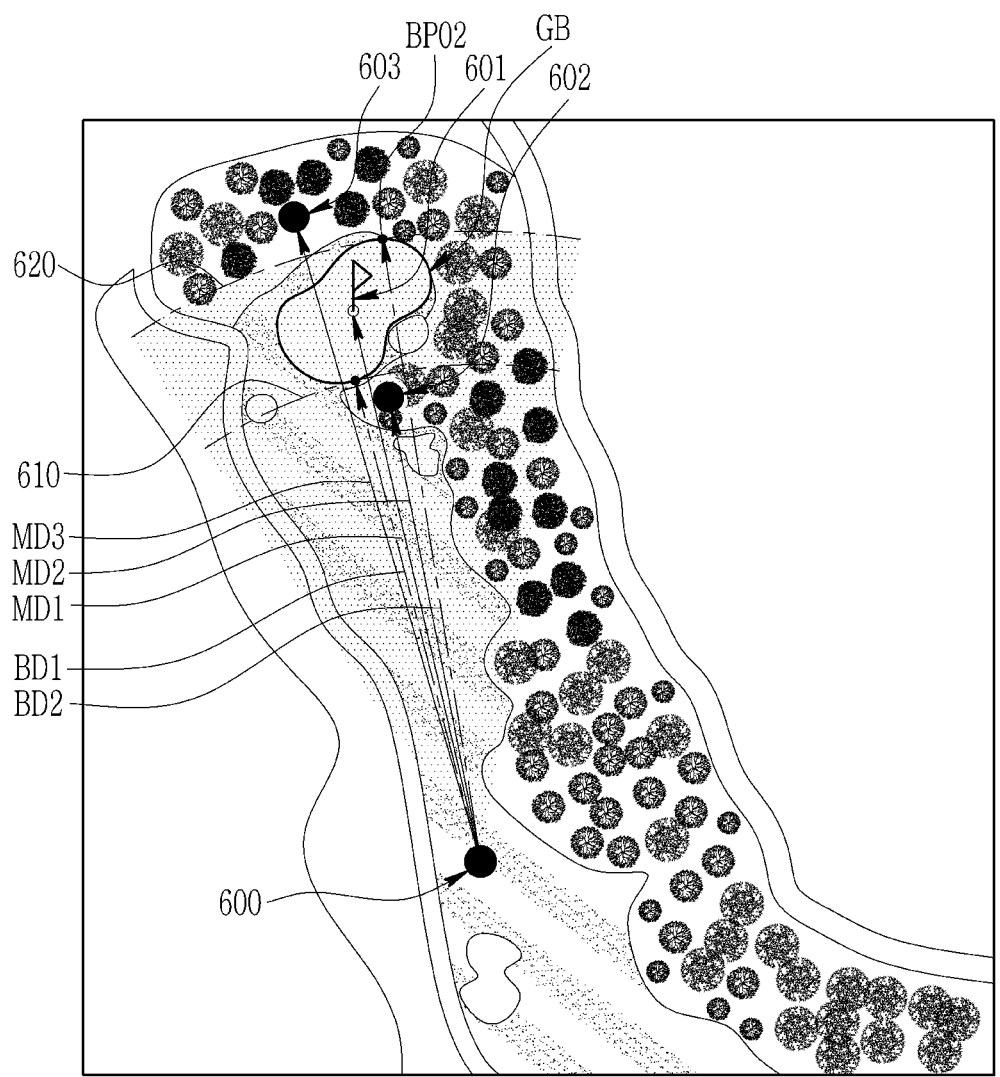
FIG. 6 illustrates an example of searching for a pin depending on the control method of FIG. 5.

FIG. 5 illustrates a flowchart of a control method of the distance measuring apparatus according to the first exemplary embodiment, and FIG. 6 illustrates an example of searching for a pin depending on the control method of FIG. 5.

First, the location acquiring sensor 112 acquires coordinates of a current location 600 (S100). The location acquiring sensor 112 may acquire coordinates of the current location 600 of the distance measuring apparatus 100.

The control unit 180 reads course map information corresponding to the coordinates of the current location 600 from the memory 160 (S102). The course map information includes location coordinates indicating a boundary GB of the green of the golf course including the coordinates of the current location 600.

The distance measuring sensor 111 measures a straight line distance from the distance measuring apparatus 100 to a target (one of 601, 602, and 603) (S104), and the slope sensor 113 measures an angle of tilt (hereinafter referred to as a tilt angle) in which the distance measuring apparatus 100 is directed to the target (S106).

Then, the control unit 180 calculates a horizontal distance from the distance measuring apparatus 100 to the target according to Equation 1 by using the measured straight line distance and the tilt angle (S108).

$$L = D \times \cos TA \quad \text{(Equation 1)}$$

In Equation 1, L indicates a horizontal distance from the distance measuring apparatus 100 to the target, D indicates a straight line distance measured by the distance measuring sensor 111, and TA indicates a tilt angle.

The control unit 180 calculates a first distance BD1 and a second distance BD2 by using the coordinates of the current position 600 and location coordinates indicating a boundary GB1 of the green (S110).

For example, the control unit 180 may calculate a distance to a point BP01 located at a closest distance from the current location 600 in the boundary GB of the green as the first distance BD1, and may calculate a distance to a point BP02 located at a farthest distance from the current location 600 in the boundary GB of the green as the second distance BD2.

The control unit 180 determines whether the calculated horizontal distance (one of MD1, MD2, and MB3) is greater than the first distance BD1 and smaller than the second distance BD2 (S112).

For the first horizontal distance MD1, it is determined that it is greater than the first distance BD1 and smaller than the second distance BD2. For the second horizontal distance MD2, it is determined that it is smaller than the first distance BD1. For the third horizontal distance MD3, it is determined that it is greater than the second distance BD2.

The control unit 180 outputs the horizontal distance MD1 by using the output unit 150 when the calculated horizontal distance MD1 is greater than the first distance BD1 and smaller than the second distance BD2 (S114).

For example, the control unit 180 may display the horizontal distance MD1 on the display unit 151 or may output it as a sound by using the sound output unit 152. In addition, the control unit 180 may output a vibration indicating that the pin is present at the horizontal distance MD1 by using the vibration output unit 153.

The control unit 180 outputs a message for guiding distance re-measurement by using the output unit 150 when the calculated horizontal distance MD2 or MD3 is smaller than the first distance BD1 or greater than the second distance BD2 (S116).

For example, the control unit 180 may display the message for guiding the distance re-measurement on the display unit 151 or may output it as a sound by using the sound output unit 152. In addition, the control unit 180 may output a vibration of a sequence for guiding the distance re-measurement using by the vibration output unit 153.

According to the control method of the distance measuring apparatus 100 as described above, a user can easily check a hole location and a distance from the current location to the hole.

Next, a control method of the distance measuring apparatus 100 according to a second exemplary embodiment will be described with reference to FIG. 7 to FIG. 9.

Figure 7:
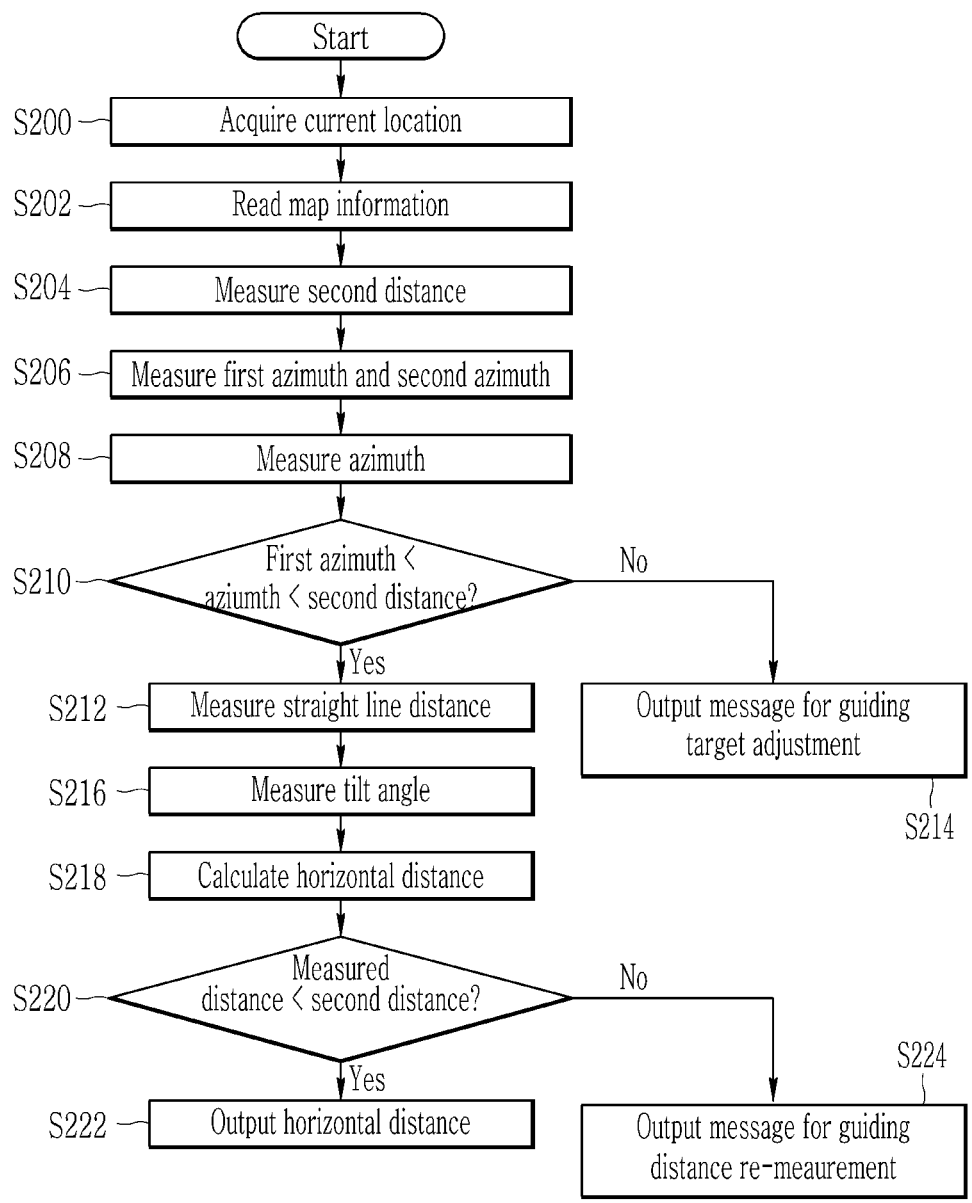
FIG. 7 illustrates a flowchart of a control method of a distance measuring apparatus according to a second exemplary embodiment.
Figure 8:
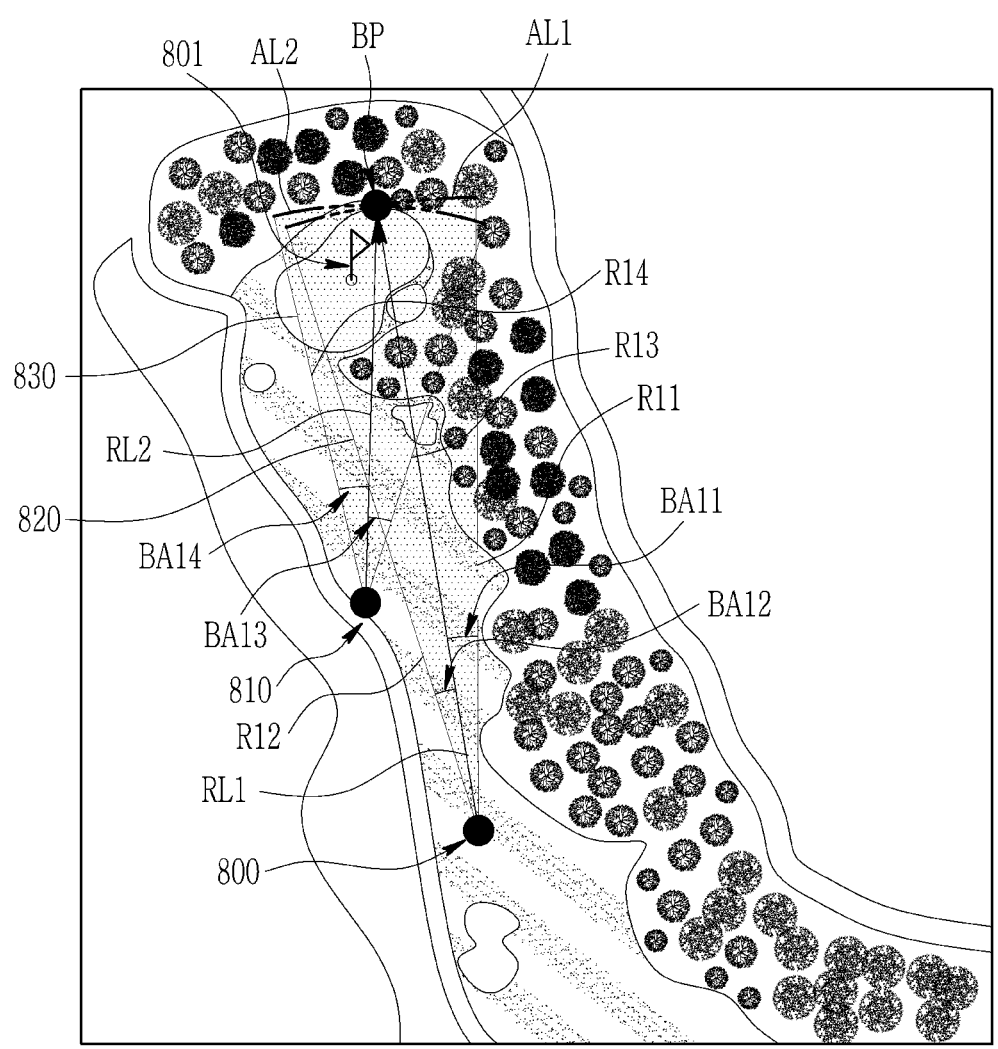
FIG. 8 and FIG. 9 illustrate examples of searching for a pin depending on the control method of FIG. 7.
Figure 9:
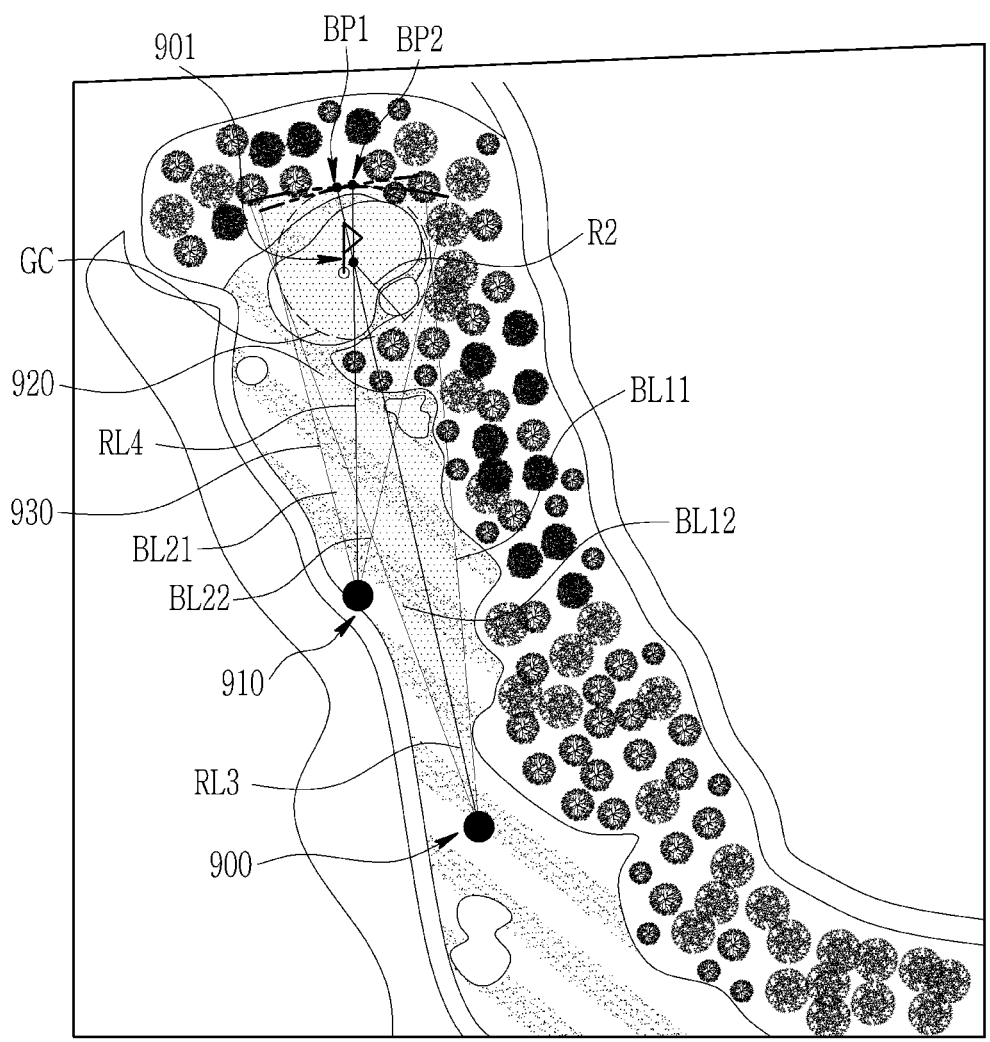

FIG. 7 illustrates a flowchart of the control method of the distance measuring apparatus 100 according to the second exemplary embodiment, and FIG. 8 and FIG. 9 illustrate examples of searching for a pin depending on the control method of FIG. 7.

First, the location acquiring sensor 112 acquires a current location (S200). The location acquiring sensor 112 may acquire coordinates of the current location of the distance measuring apparatus 100.

The control unit 180 reads course map information corresponding to the coordinates of the current location from the memory 160 (S202). The course map information includes location coordinates indicating a predetermined point on the green of the golf course including the coordinates of the current location.

The predetermined point, which is a point on the green located on the corresponding golf course, may be, e.g., a point BP located farthest from a pin 801 along a predetermined direction among boundaries of the green of each golf course as illustrated in FIG. 8. Alternatively, the predetermined point may be a central point CP of the green of each golf course, as illustrated in FIG. 9. The central point CP may be a predetermined point for each golf course. The central point CP may be a different location from a pin 901.

The central point CP has coordinates including medians of x-axis coordinates and medians of y-axis coordinates among coordinates of the green on a plane formed by two intersecting axes (e.g., x-axis and y-axis). Alternatively, the central point CP may have coordinates including averages of x-axis coordinates and average values of y-axis coordinates among the coordinates of the green.

The control unit 180 calculates a second distance from the current position to a predetermined point (S204).

As an example, as illustrated in FIG. 8, when the current location is a point 800, the control unit 180 may calculate a distance RL1 from the current location 800 to the point BP as the second distance. In addition, when the current location is a point 810, the control unit 180 may calculate a distance RL2 from the current location 810 to the point BP as the second distance.

As another example, as illustrated in FIG. 9, when the current location is a point 900, the control unit 180 may calculate a longest distance RL3 from the current location 900 to a circle GC centering on a point CP as the second distance. In this case, the circle GC may have a radius R2 of a predetermined length (e.g., 10 to 20 m). In addition, when the current location is a point 910, the control unit 180 may calculate a longest distance RL4 from the current location 910 to the circle GC centering on the point CP as the second distance.

Next, the control unit 180 calculates the first azimuth and the second azimuth (S206).

For example, as illustrated in FIG. 8, when the current location is a point 800, the control unit 180 calculates a central angle of a fan 820 having the distance RL1 as a radius length in the case where a length of an arc AD of the fan 820 satisfies a specific length (e.g., 30 to 50 m). In addition, the control unit 180 respectively calculates azimuths of two radii R11 and R12 of the fan 820 as the first azimuth and the second azimuth when a line connecting the current location 800 to the point BP bisects a central angle of the fan 820 (including the case of generally bisecting it, including the case that BA11 and BA12 have exactly the same value or have different values within a 1 degree range).

In addition, when the current location is a point 810, the control unit 180 calculates a central angle of a fan 830 having the distance RL2 as a radius length in the case where a length of an arc AL2 of the fan 830 satisfies a specific length. In addition, the control unit 180 respectively calculates azimuths of two radii R13 and R14 of the fan 830 as the first azimuth and the second azimuth when a line connecting the current location 810 to the point BP bisects a central angle of the fan 830 (including the case of generally bisecting it, including the case that BA13 and BA14 have exactly the same value or have different values within a 1 degree range).

As another example, as illustrated in FIG. 9, when the current location is a point 900, the control unit 180 respectively calculates the azimuths of two tangent lines BL11 and BL12 from the current location 900 to a circle GC as the first azimuth and the second azimuth.

In addition, when the current location is a point 910, the control unit 180 respectively calculates the azimuths of two tangent lines BL21 and BL22 from the current location 910 to the circle GC as the first azimuth and the second azimuth.

The azimuth sensor 114 measures an azimuth in a direction in which the distance measuring apparatus 100 faces (S208).

The control unit 180 determines whether the measured azimuth is included in a range of the first azimuth to the second azimuth (S210). In this case, the range of the first azimuth to the second azimuth indicates a range in which an angle formed by the first azimuth to the second azimuth is 180 degrees or less.

When the measured azimuth is included in the range of the first azimuth to the second azimuth, the control unit 180 may display a message for guiding distance measurement on the display unit 151 or may output it as a sound by using the sound output unit 152. In addition, the control unit 180 may output a vibration of a sequence for guiding distance measurement using by the vibration output unit 153.

The control unit 180 outputs a message for guiding target adjustment by using the output unit 150 when the measured azimuth is not included in the first azimuth to the second azimuth (S214). For example, the control unit 180 may display the message for guiding the target adjustment on the display unit 151 or may output it as a sound by using the sound output unit 152. In addition, the control unit 180 may output a vibration of a sequence for guiding the target adjustment using by the vibration output unit 153.

Next, the distance measuring sensor 111 measures a straight line distance from the distance measuring apparatus 100 to a target (S212), and the slope sensor 113 measures a tilt angle of the distance measuring apparatus 100 (S216).

Then, the control unit 180 calculates a horizontal distance from the distance measuring apparatus 100 to the target according to Equation 1 by using the measured straight line distance and the tilt angle (S218).

The control unit 180 determines whether the horizontal distance is smaller than the second distance (S220).

The control unit 180 outputs the horizontal distance by using the output unit 150 when the calculated horizontal distance is smaller than the second distance (S222).

For example, the control unit 180 may display the horizontal distance on the display unit 151 or may output it as a sound by using the sound output unit 152. In addition, the control unit 180 may output a vibration indicating that the pin is present at the measured horizontal distance using the vibration output unit 153.

The control unit 180 outputs a message guiding distance re-measurement by using the output unit 150 when the calculated horizontal distance is greater than or equal to the second distance (S224). For example, the control unit 180 may display the message for guiding the distance re-measurement on the display unit 151 or may output it as a sound by using the sound output unit 152. In addition, the control unit 180 may output a vibration of a sequence for guiding the distance re-measurement using by the vibration output unit 153.

According to the control method of the distance measuring apparatus 100 as described above, a user can easily check a hole location and a distance from the current location to the hole.

Next, a control method of the distance measuring apparatus 100 according to a third exemplary embodiment will be described with and to FIG. 10 and FIG. 11.

Figure 10:
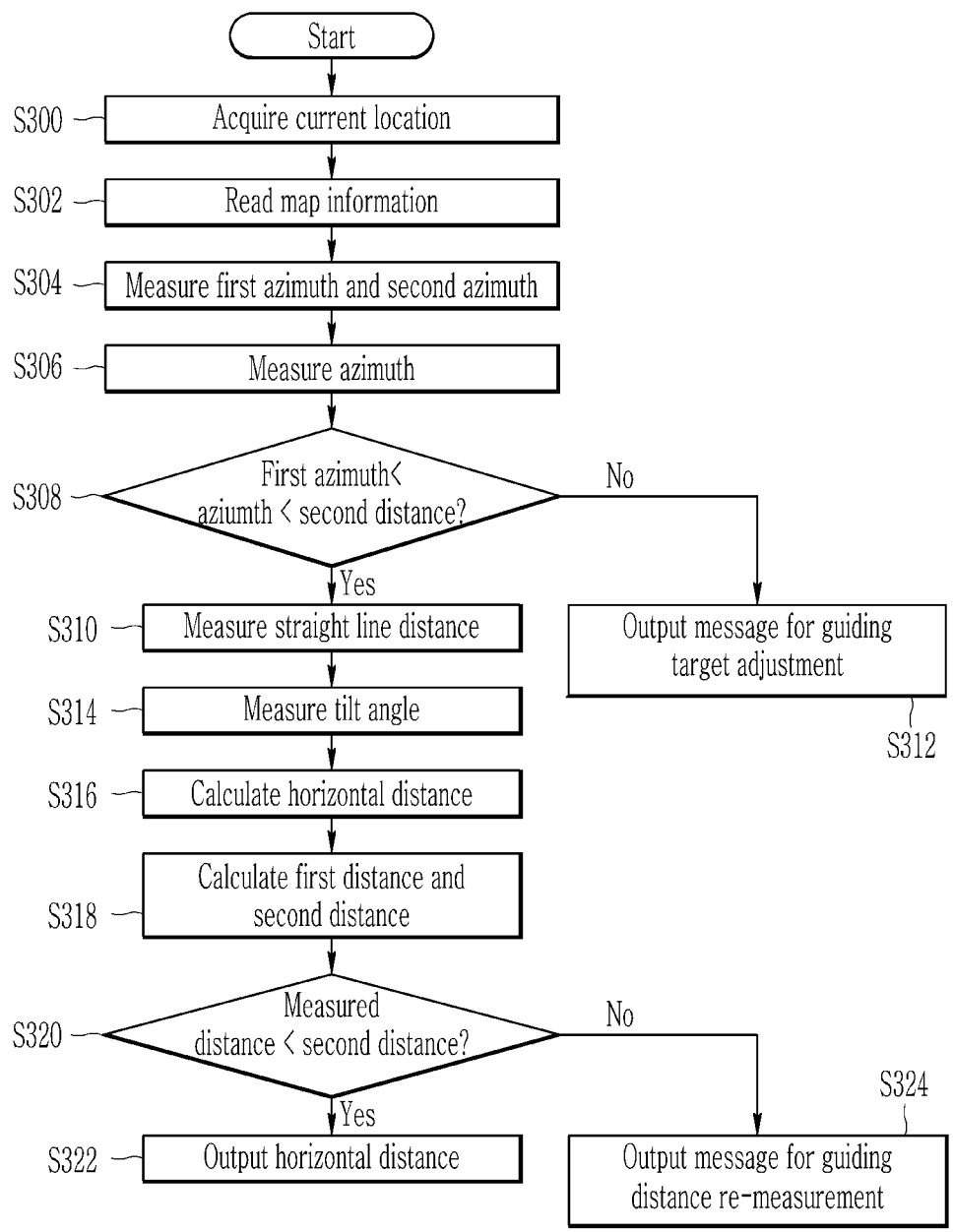
FIG. 10 illustrates a flowchart of a control method of a distance measuring apparatus according to a third exemplary embodiment.
Figure 11:
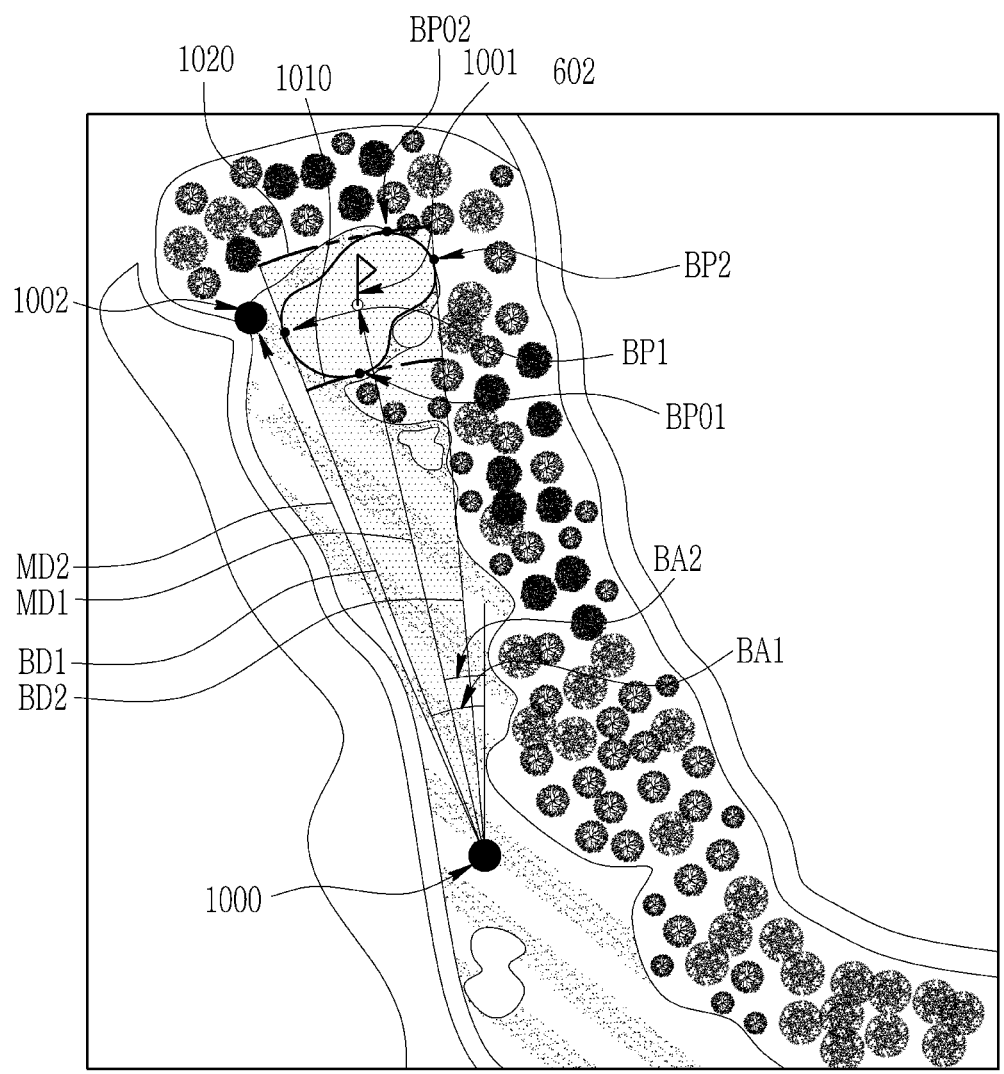
FIG. 11 illustrates an example of searching for a pin depending on the control method of FIG. 10.

FIG. 10 illustrates a flowchart of a control method of the distance measuring apparatus 100 according to a third exemplary embodiment, and FIG. 11 illustrates an example of searching for a pin depending on the control method of FIG. 10.

First, the location acquiring sensor 112 acquires coordinates of a current location 1000 (S300). The location acquiring sensor 112 may acquire coordinates of the current location 1000 of the distance measuring apparatus 100.

The control unit 180 reads course map information corresponding to the coordinates of the current location 1000 from the memory 160 (S302). The course map information includes location coordinates indicating a boundary GB of the green of the golf course including the coordinates of the current location 1000.

Then, the control unit 180 calculates the first azimuth and the second azimuth (S304).

For example, the control unit 180 calculates azimuths of two tangent lines from a current location 1000 to two contact points BP1 and BP2 of a boundary GB of the green as the first azimuth and the second azimuth, respectively. In this case, the two contact points BP1 and BP2 may correspond to two contact points between the boundary GB of the green and the two tangent lines, respectively, from the current location 1000.

The azimuth sensor 114 measures an azimuth in a direction in which the distance measuring apparatus 100 faces (S306).

The control unit 180 determines whether the measured azimuth is included in a range of a first azimuth BA1 to a second azimuth BA2 (S308). In this case, the range of the first azimuth BA1 to the second azimuth BA2 indicates a range in which an angle formed by the first azimuth BA1 to the second azimuth BA2 is 180 degrees or less.

When the measured azimuth is included in the range of the first azimuth BA1 to the second azimuth BA2, the control unit 180 may display a message for guiding distance measurement on the display unit 151 or may output it as a sound by using the sound output unit 152. In addition, the control unit 180 may output a vibration of a sequence for guiding distance measurement using by the vibration output unit 153.

The control unit 180 outputs a message for guiding target adjustment by using the output unit 150 when the measured azimuth is not included in the first azimuth BA1 to the second azimuth BA2 (S312). Specifically, the control unit 180 may display the message for guiding the target adjustment on the display unit 151 or may output it as a sound by using the sound output unit 152. In addition, the control unit 180 may output a vibration of a sequence for guiding the target adjustment using by the vibration output unit 153.

Further, when the distance measuring apparatus 100 faces a target 1002, the control unit 180 determines that an azimuth in a direction of the target 1002 is not included in the first azimuth BA1 to the second azimuth BA2, and a horizontal distance MD2 from the distance measuring apparatus 100 to the target 1002 may not be calculated.

The distance measuring sensor 111 measures a straight line distance from the distance measuring apparatus 100 to a target 1001 (S310), and the slope sensor 113 measures a tilt angle of the distance measuring apparatus 100 (S314).

Then, the control unit 180 calculates a horizontal distance MD1 from the distance measuring apparatus 100 to the target according to Equation 1 by using the measured straight line distance and the tilt angle (S316).

The control unit 180 calculates a first distance BD1 and a second distance BD2 by using the coordinates of the current position 1000 and location coordinates indicating a boundary GB1 of the green (S318).

For example, the control unit 180 may calculate a distance to a point BP01 located at a closest distance from the current location 1000 in the boundary GB of the green as the first distance BD1, and may calculate a distance to a point BP02 located at a farthest distance from the current location 1000 in the boundary GB of the green as the second distance BD2.

The control unit 180 determines whether the calculated horizontal distance MD1 is greater than the first distance BD1 and smaller than the second distance BD2 (S320).

The control unit 180 outputs the horizontal distance MD1 by using the output unit 150 when the calculated horizontal distance MD1 is greater than the first distance BD1 and smaller than the second distance BD2 (S322).

For example, the control unit 180 may display the horizontal distance MD1 on the display unit 151 or may output it as a sound by using the sound output unit 152. In addition, the control unit 180 may output a vibration indicating that the pin is present at the horizontal distance MD1 by using the vibration output unit 153.

The control unit 180 outputs a message for guiding distance re-measurement by using the output unit 150 when the calculated horizontal distance is smaller than the first distance BD1 or greater than the second distance BD2 (S324).

For example, the control unit 180 may display the message for guiding the distance re-measurement on the display unit 151 or may output it as a sound by using the sound output unit 152. In addition, the control unit 180 may output a vibration of a sequence for guiding the distance re-measurement using by the vibration output unit 153.

According to the control method of the distance measuring apparatus 100 as described above, a user can easily check a hole location and a distance from the current location to the hole.

Next, a control method of the distance measuring apparatus 100 according to a fourth exemplary embodiment will be described with and to FIG. 12 and FIG. 13.

Figure 12:
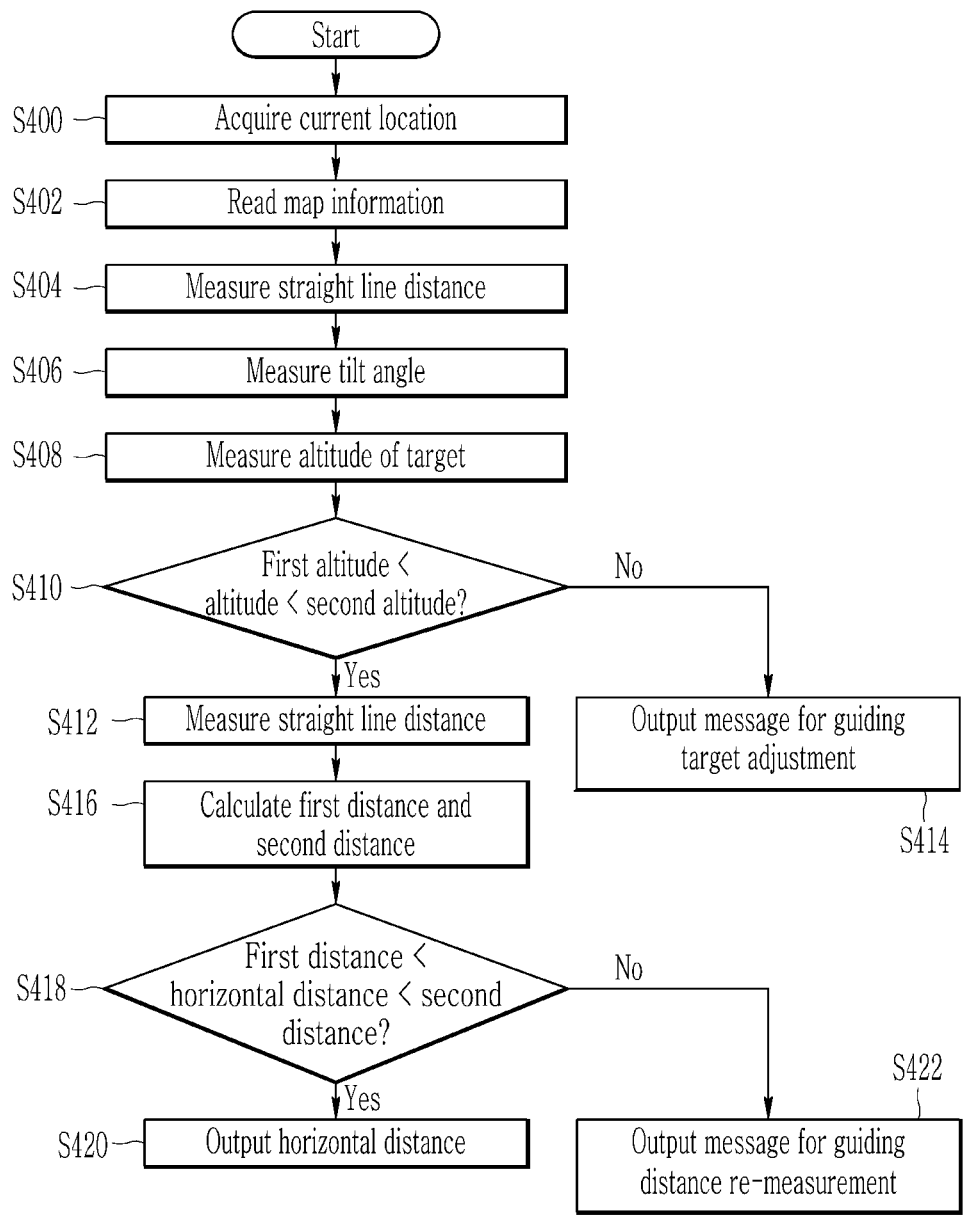
FIG. 12 illustrates a flowchart of a control method of a distance measuring apparatus according to a fourth exemplary embodiment.
Figure 13:
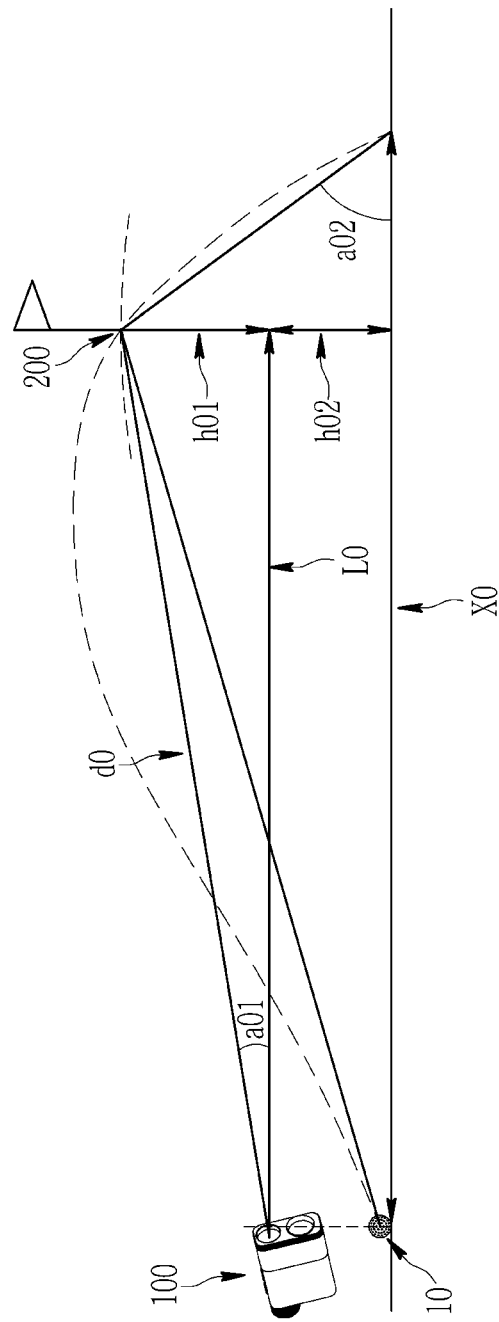
FIG. 13 illustrates an example of searching for a pin depending on the control method of FIG. 12.

FIG. 12 illustrates a flowchart of a control method of the distance measuring apparatus 100 according to a fourth exemplary embodiment, and FIG. 13 illustrates an example of searching for a pin depending on the control method of FIG. 12.

First, the location acquiring sensor 112 acquires a current location (S200). The location acquiring sensor 112 may acquire coordinates of the current location of the distance measuring apparatus 100. In particular, the location acquiring sensor 112 may acquire information related to an altitude of the current location.

The control unit 180 reads course map information corresponding to the coordinates of the current location from the memory 160 (S202). The course map information may include information related to an altitude of the green of the golf course including the coordinates of the current location, location coordinates indicating the boundary of the green, and the like.

The distance measuring sensor 111 measures a straight line distance MD11 from the distance measuring apparatus 100 to a target 200 (S404), and the slope sensor 113 measures a tilt angle TA1 of the distance measuring apparatus 100 (S406).

Then, the control unit 180 calculates an altitude of the target 200 from the distance measuring apparatus 100 by using Equation 2 using the measured straight distance MD11 and the tilt angle TA1 (S408).

$$h01 = MD1 \times \sin TA1 \qquad \text{(Equation 2)}$$

In Equation 2, h01 indicates an altitude difference from the distance measuring apparatus 100 to the target, MD1 indicates a straight line distance TA1 measured by the distance measuring sensor 111, and TA indicates a tilt angle.

The control unit 180 may calculate an altitude of the target 200 by adding the altitude difference h01 from the distance measuring apparatus 100 to the target 200 to an altitude H0 of the distance measuring apparatus 100.

Next, the control unit 180 determines whether the altitude of the target 200 is included in a range of a first altitude to a second altitude (S410). The first altitude includes an altitude H1 of the hole obtained from information related to an altitude of the green of the golf course read in step S402, and the second altitude includes an altitude plus a height h11 of the pin from the first altitude. In addition, the first altitude and the second altitude may be a highest altitude and a lowest altitude of the green altitudes, respectively. A method of determining the first altitude and the second altitude is not limited to the above description.

When the altitude of the target 200 is included in a range of a first altitude to a second altitude, the control unit 180 calculates a horizontal distance L11 from the distance measuring apparatus 100 to the target according to Equation 1 by using the measured straight line distance and the tilt angle (S412).

The control unit 180 outputs a message guiding target adjustment by using the output unit 150 when the altitude of the target 200 is not included in the range of the first altitude to the second altitude (S414). For example, the control unit 180 may display the message for guiding the target adjustment on the display unit 151 or may output it as a sound by using the sound output unit 152. In addition, the control unit 180 may output a vibration of a sequence for guiding the target adjustment using by the vibration output unit 153.

The control unit 180 calculates a first distance and a second distance by using the coordinates of the current position and location coordinates indicating a boundary of the green (S416). A description of step S416 is the same as step S112 or step S318 described above, so the description will be omitted.

The control unit 180 determines whether the calculated horizontal distance L11 is greater than the first distance and smaller than the second distance (S418).

The control unit 180 outputs the horizontal distance L11 by using the output unit 150 when the calculated horizontal distance L11 is greater than the first distance and smaller than the second distance (S420).

For example, the control unit 180 may display the horizontal distance L11 on the display unit 151 or may output it as a sound by using the sound output unit 152. In addition, the control unit 180 may output a vibration indicating that the pin is present at the horizontal distance L11 by using the vibration output unit 153.

The control unit 180 outputs a message for guiding distance re-measurement by using the output unit 150 when the calculated horizontal distance L11 is smaller than the first distance or greater than the second distance.

For example, the control unit 180 may display the message for guiding the distance re-measurement on the display unit 151 or may output it as a sound by using the sound output unit 152. In addition, the control unit 180 may output a vibration of a sequence for guiding the distance re-measurement using by the vibration output unit 153.

According to the control method of the distance measuring apparatus 100 as described above, a user can easily check a hole location and a distance from the current location to the hole.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A distance measuring apparatus comprising:
an output unit configured to output information;
a memory configured to store map information of golf courses;
a location acquiring sensor configured to acquire a current location;
a distance measuring sensor configured to measure a distance to a target;
a slope sensor configured to measure a tilt angle;
an azimuth sensor configured to measure an azimuth of the target; and
a control unit configured to read map information of the golf course corresponding to the current location from the memory, to calculate a first distance from the current location to a first point on the golf course by using the map information, to calculate a horizontal distance to the target by using the distance to the target and the tilt angle, to determine whether the horizontal distance is within the first distance, to determine whether the azimuth is included in a range between a first azimuth in a direction connecting a second point of the golf course from the current location and a second azimuth in a direction of connecting a third point of the golf course from the current location, and to output the horizontal distance to the output unit when the horizontal distance is within the first distance and when the azimuth is included in the range between the first azimuth and the second azimuth,
wherein the second point of the golf course and the third point of the golf course are different from a point of the target.

2. The distance measuring apparatus of claim 1, wherein the second point and the third point are two points where an arc and two radii of a fan having the first distance as a length of a radius thereof meet each other when a length of the arc of the fan satisfies a predetermined length.

3. The distance measuring apparatus of claim 2, wherein a central angle of the fan is bisected by a connection line between the current location and the first point.

4. The distance measuring apparatus of claim 1, wherein the second point and the third point are two points where two tangent lines from the current location to the green of the golf course contact the green.

5. The distance measuring apparatus of claim 1, wherein the first point is a longest point from the current location on the green of the golf course.

6. The distance measuring apparatus of claim 5, wherein the control unit further calculates a second distance from the current location to a fourth point of the golf course, and outputs the horizontal distance to the output unit when the horizontal distance is included in a range between the first distance and the second distance, and the fourth point is a shortest point from the current location on the green of the golf course.

7. The distance measuring apparatus of claim 1, wherein the second point and the third point are two points that are in contact with a circle centered on the central point of the green of the golf course from the current position and having a predetermined distance as a radius, and the first point is a longest point from the current location on the circle.

8. The distance measuring apparatus of claim 1, wherein the control unit calculates an altitude of the target by using an altitude of the current location, the distance to the target, and the tilt angle, and calculates a horizontal distance to the target when the altitude of the target is included between the altitude of the hole obtained from the map information and a sum of a predetermined height and the altitude of the hole.

9. The distance measuring apparatus of claim 1, wherein The control unit outputs a message for guiding re-measurement to the output unit when the horizontal distance is outside the first distance.

10. A control method of a distance measuring apparatus, comprising:
acquiring, by a location acquiring sensor, a current location of the distance measuring apparatus;
reading out, by a control unit, map information of golf courses corresponding to the current location from a memory in which the map information of the golf courses is stored;
measuring, by a distance measuring sensor, a distance to a target;
measuring, by a slope sensor, a sloped tilt angle;
measuring, by an azimuth sensor, an azimuth to which the distance measuring apparatus is directed;
calculating, by the control unit, a horizontal distance to the target by using the distance to the target and the tilt angle;
calculating, by the control unit, a first distance from the current location to a first point of the golf course;
determining, by the control unit, whether the horizontal distance is within the first distance;

determining, by the control unit, whether the azimuth is included in a range between a first azimuth in a direction connecting a second point of the golf course from the current location and a second azimuth in a direction of connecting a third point of the golf course from the current location, wherein the second point of the golf course and the third point of the golf course are different from a point of the target; and outputting, by the control unit, the horizontal distance when the horizontal distance is within a first distance and when the azimuth is included in the range between the first azimuth and the second azimuth.

11. The control method of claim 10, wherein the second point and the third point are two points where an arc and two radii of a fan having the first distance as a length of a radius thereof meet each other when a length of the arc of the fan satisfies a predetermined length.

12. The control method of claim 11, wherein a central angle of the fan is divided by a connection line between the current location and the first point.

13. The control method of claim 10, wherein the second point and the third point are two points where two tangent lines from the current location to the green of the golf course contact the green.

14. The control method of claim 10, wherein the first point is a longest point from the current location on the green of the golf course.

15. The control method of claim 14, wherein the calculating the first distance includes calculating, by the control unit, a second distance from the current location to a fourth point of the golf course, the outputting the horizontal distance includes outputting, by the control unit, the horizontal distance when the horizontal distance is included in a range between the first distance and the second distance, and the fourth point is a shortest point from the current location on the green of the golf course.

16. The control method of claim 10, wherein the second point and the third point are two points that are in contact with a circle centered on the central point of the green of the golf course from the current position and having a predetermined distance as a radius, and the first point is a longest point from the current location on the circle.

17. The control method of claim 10, further comprising:

before the calculating the horizontal distance, calculating, by the control unit, an altitude of the target by using an altitude of the current location, the distance to the target, and the tilt angle; and calculating, by the control unit, a horizontal distance to the target when the altitude of the target is included between the altitude of the hole obtained from the map information and a sum of a predetermined height and the altitude of the hole.

18. The control method of claim 10, further comprising outputting, by the control unit, a message for guiding re-measurement to the output unit when the horizontal distance is outside the first distance.

\* \* \* \* \*